Patented Aug. 16, 1932

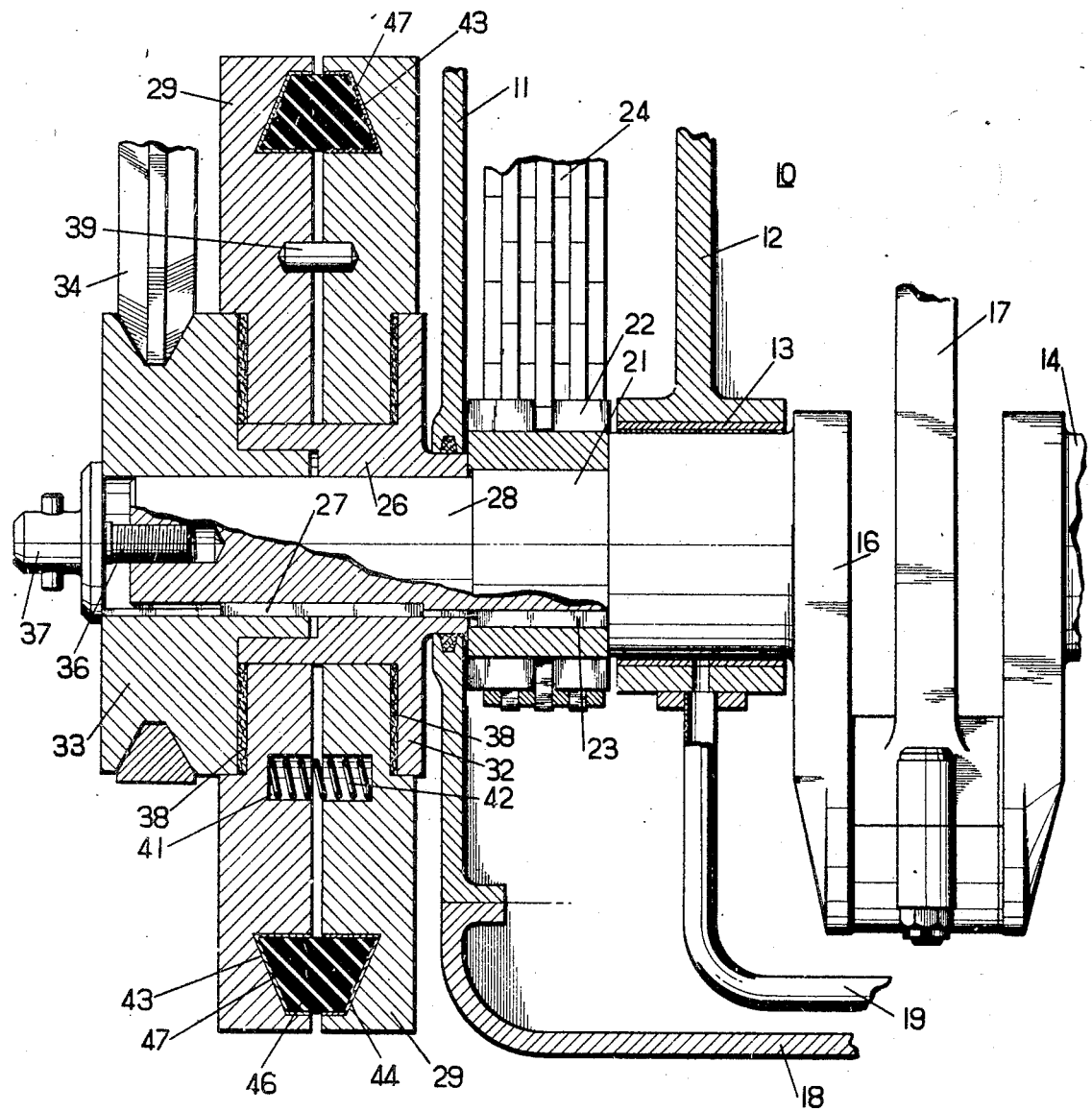

1,871,480

UNITED STATES PATENT OFFICE

MILTON TIBBETTS, OF DETROIT, MICHIGAN, ASSIGNOR TO PACKARD MOTOR CAR COMPANY, OF DETROIT, MICHIGAN, A CORPORATION OF MICHIGAN

INTERNAL COMBUSTION ENGINE

Application filed January 7, 1929, Serial No. 330,889. Renewed September 23, 1931.

This invention relates to internal combustion engines and particularly to means for controlling torsional vibration in the shafts of such engines.

It has for one of its objects to provide a reliable and effective vibration damper for shafts subjected to such torsional vibration.

Another object of the invention is to provide a vibration damper which shall be free from unbalance caused by non-uniform operation of the speed responsive weight member.

Another object of the invention is to provide a vibration damper in which sticking and binding shall be obviated and in which there shall be no rusting or corroding of the parts and no improper adherence therebetween.

A further object of the invention is to provide a vibration damper having but few parts of simple construction, which shall be inexpensive to build and easy to operate and maintain.

Other objects of the invention will appear from the following description taken in connection with the drawing which forms a part of this specification, and in which the single figure is a view partially in side elevation and partially in vertical longitudinal section, through a portion of an internal combustion engine having a vibration damper constructed in accordance with the invention.

Referring to the drawing, at 10 is shown a portion of an internal combustion engine having a crank case 11 provided with transverse webs such as 12, in which suitable aligned bearings 13 are supported. In these bearings is journaled a crank shaft 14, having cranks 16, which crank shaft is adapted to be driven by connecting rods 17 from pistons located in the engine cylinders (not shown). The lower part of the crank case is closed by an oil pan 18, removably secured thereto in any suitable manner, thus providing a sump for the lubricating oil of the engine. This oil is circulated to the various engine bearings in any convenient way as by means of pipes such as 19, the overflow returning to the sump.

At the forward end of the engine, in front of the first bearing 13, the crank shaft is reduced in diameter as at 21, and a sprocket gear 22 is mounted thereon and connected by means of a key 23 to rotate with the shaft. This sprocket is adapted to drive a flexible chain 24 by means of which the cam shaft, the generator shaft, and other auxiliaries to the engine proper (not shown) may be driven.

The damping means of the invention is illustrated as mounted at the end of the engine crank shaft upon a suitable bearing part thereon, and it comprises a hub member 26, keyed as at 27 to a reduced portion 28 of the shaft, on which a pair of spaced inertia members 29 are rotatably mounted. The hub member 26 is provided with an integral flange 32, and is secured against axial movement on the crank shaft by a retaining member adapted to clamp it against the hub of the sprocket 22. The retaining member may be a pulley 33, also keyed to the crank shaft and adapted to drive the engine fan (not shown) through a suitable belt 34. The member 33 may be retained on the shaft by a bolt member 36, threaded into the end of the shaft, and having a pulley engaging head portion 37, which may also constitute the usual starting jaw for cooperation with a suitable crank for manually rotating the crank shaft in starting the engine.

The flange 32 and the pulley 33 thus provide spaced braking members between which the inertia members are mounted, and which are preferably provided with suitable friction material 38 for braking engagement with the adjacent side faces of the inertia members 29. The friction thus provided causes the damping action. The inertia members 29 are constrained to rotate together in any convenient manner, as by a dowel 39, and are also provided with oppositely disposed aligned recesses 41 in which suitable compression springs 42 are disposed. These springs urge the inertia members axially apart and into initial frictional engagement with their respective braking members. In this way sufficient friction to secure initial damping at low engine speeds is provided.

To provide for increased damping at the higher speeds, the damper is provided with speed responsive means operable to increase the axial pressure, urging the inertia members apart to increase the braking pressure on the friction facings 38, and accordingly the damping friction. To this end each of the inertia members 29 is provided with a circular groove 43 in its radial face, having an inclined surface 44, which grooves, being oppositely disposed, form a circular channel of trapezoidal or wedge-shaped section. In this channel is disposed a ring 46 of corresponding cross section, composed of some resilient material, preferably rubber, which is loaded or impregnated with any suitabe heavy material, such as lead. Upon an increase in shaft speed, the centrifugal force acts on the ring 46 to expand it radially so that the inclined faces of the ring exert a wedging action on the corresponding faces 44 of the grooves 43. This tends to axially expand or separate the inertia members 29, to increase the damping friction as previously explained.

In devices of this character heretofore constructed, the inertia members are usually formed of iron or steel, which material is sufficiently heavy and has the requisite mechanical strength. It has been found, however, that considerable trouble is caused in the operation of such dampers by adhesion between those inertia members and the rubber ring 46. Such adhesion tends to prevent the operation of the damper, which then operates simply as a secondary fly wheel, the initial friction being insufficient to adequately damp the shaft vibration at the higher speeds. Such adhesion may be caused by a rusting together of the parts, or by sticking of the ring 46 through partial vulcanization of the rubber from the heat of friction. When such adhesion occurs at a part only of the contacting surfaces, the ring 46 is unequally expanded or distorted by the centrifugal force, causing an unbalance of the damper, which results in a rough and noisy engine. Such a damper, if continued in operation, may cause serious damage to the crank shaft, bearings and associated parts of the engine.

To obviate these difficulties, this invention provides means to prevent such adherence between the ring 46 and the inertia members. For this purpose a shield member or liner 47 is provided between each of the grooves 43 and the cooperating ring 46, these liners being formed of a non-adherent and non-corrodible material, such as brass or bronze, which will not rust and to which the heated rubber will not stick. The liners 47 are conveniently formed of thin stampings of sheet brass or other suitable metal, but it is to be understood that the invention is not limited to brass or to any other metal, nor to material in the form of stampings, but that any suitable non-adherent and non-corrosive lining material may be used. These liners are formed to correspond to the shape of the grooves 43, and are placed therein before assembly of the damper, being thereafter retained in position by the pressure of the rubber ring 46 with which they are in contact.

The operation of the device will be readily understood without further explanation, from the above description, and it will be apparent that this invention provides a simple and inexpensive device whereby difficulties caused by the adherence of such dampers are completely obviated.

While a specific embodiment of the invention has been herein described, which is deemed to be new and advantageous and may be specifically claimed, it is not to be understood that the invention is limited to the exact details of the construction, as it will be apparent that changes may be made therein without departing from the spirit or scope of the invention.

Having thus described the invention, what is claimed and desired to be secured by Letters Patent is:

1. A vibration damper for shafts comprising inertia members rotatably mounted on the shaft, friction means between the inertia members and the shaft, expansible weight means carried by the inertia members and operable in response to centrifugal force to urge said inertia members into engagement with the friction means, and a liner of material non-adherent to the weight means carried by the inertia members and interposed between the inertia members and said weight means.

2. A vibration damper for shafts comprising friction members secured to the shaft, rotatable inertia members axially separable to engage the friction members, an annular wedge member radially expansible in response to centrifugal force to separate said inertia members and a solid anti-friction liner carried by the inertia members and interposed between the wedge member and each inertia member.

3. A vibration damper for shafts comprising friction members secured to the shaft, rotatable inertia members axially separable to engage the friction members having inclined faces, an annular resilient wedge member having a mounting of heavy material between the inclined faces adapted to urge the inertia members apart upon expansion in response to centrifugal force, and a rustless liner carried by the inertia members and interposed between each inertia member and the wedge member.

4. A vibration damper having inertia members, a speed responsive weight device cooperating therewith, and a shield member non-adherent to the weight device carried by the inertia members and interposed between the inertia members and the weight device.

5. In a vibration damper having inertia members and a speed responsive weight device cooperating therewith, said members and said weight device having engaging portions relatively movable in response to speed changes, a liner carried by said members and interposed between the said relatively movable portions of the members and the weight device to prevent adhesion therebetween.

6. A vibration damper for shafts comprising inertia members each having a groove, said grooves cooperating to form a channel, friction means on said shaft, speed responsive means between said inertia members in said channel adapted to engage said members with said friction means, and a liner in each groove to prevent adhesion between the inertia members and said speed responsive means.

7. The combination with a vibration damper for shafts having friction means on said shaft and inertia members rotatably mounted on the shaft and axially separable to engage said friction means, of resilient weight means between the inertia members radially expansible in response to centrifugal force to increase the axial pressure of the inertia members on the friction means, and liners of soft metal non-adherent to said weight means carried by said inertia members and interposed between the inertia members and said weight means.

8. A vibration damper for shafts comprising friction members secured to the shaft, rotatable inertia members axially separable to engage the friction members, an annular wedge member radially expansible in response to centrifugal force to separate said inertia members, and strips of material non-adherent to said wedge member carried by the inertia members and interposed between each inertia member and the wedge member.

9. A vibration damper for shafts comprising friction members secured to the shaft, rotatable inertia members axially separable to engage the friction members, an annular wedge member radially expansible in response to centrifugal force to separate said inertia members, and annular liners of anti-friction material carried by said inertia members and interposed between the wedge member and each inertia member.

10. A vibration damper for a shaft comprising an inertia member mounted for rotation with respect to the shaft, a member mounted for rotation with the shaft and having a frictional connection with said inertia member, one of said members being movable axially of the shaft with respect to the other to vary the friction, expansible weight means engaging one of said members and operable in response to centrifugal force to urge the member engaged thereby axially of the shaft, and a liner of material non-adherent to the weight means carried by the inertia member and interposed between the expansible weight means and the said member.

11. A vibration damper for a shaft comprising an inertia member and a thrust member, said members being mounted for rotation with respect to said shaft, an abutment carried by said shaft for limiting axial movement of said inertia member and having frictional connection therewith, means radially and axially expansible in response to centrifugal force interposed between said members to urge said inertia member axially, and an anti-friction liner carried by and interposed between said means and said inertia member.

In testimony whereof I affix my signature.

MILTON TIBBETTS.